(12) United States Patent
Tsunoda

(10) Patent No.: US 7,388,703 B2
(45) Date of Patent: Jun. 17, 2008

(54) OPTICAL TRANSMISSION DEVICE AND OPTICAL PHASE MODULATOR

(75) Inventor: Yukito Tsunoda, Isehara (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 11/386,933

(22) Filed: Mar. 23, 2006

(65) Prior Publication Data
US 2007/0139754 A1   Jun. 21, 2007

(30) Foreign Application Priority Data
Dec. 19, 2005   (JP)   ............................. 2005-365245

(51) Int. Cl.
  *G02B 26/00* (2006.01)
  *G02F 1/295* (2006.01)
  *G02F 3/00* (2006.01)
(52) U.S. Cl. ........................... 359/237; 385/5; 359/108
(58) Field of Classification Search ................ 359/108, 359/237–238, 278–279, 290–292, 298, 300–301; 385/1–3, 5, 8–9
See application file for complete search history.

(56) References Cited

U.S. PATENT DOCUMENTS 6,359,720 B1 * 3/2002 Yamada ...................... 359/245
7,046,414 B2 * 5/2006 Ohhira ....................... 359/238

FOREIGN PATENT DOCUMENTS

| JP | 08-139681 | 5/1996 |
| JP | 10-011268 | 1/1998 |

OTHER PUBLICATIONS

K. Yonenaga, et al., "Optical duobinary transmission system with no receiver sensitivity degradation" Electronics Letters, vol. 31, No. 4, Feb. 16, 1995.

* cited by examiner

*Primary Examiner*—Scott J. Sugarman
*Assistant Examiner*—Dawayne A Pinkney
(74) *Attorney, Agent, or Firm*—Staas & Halsey LLP

(57) ABSTRACT

An optical transmission device includes an optical phase modulator and a signal generation function. The optical phase modulator is controlled, so that when the state of an intensity-modulated optical signal shifts from a first luminescent state, through a non-luminescent state, to a second luminescent state, the phase of the optical signal in the first luminescent state and the phase of the optical signal in the second luminescent state are inverted with respect to each other, or so that when the state of the intensity-modulated optical signal shifts from the first luminescent state, through two or more non-luminescent states, to a third luminescent state, the phase of the optical signal in the first luminescent state and the phase of the optical signal in the third luminescent state are inverted with respect to each other.

14 Claims, 20 Drawing Sheets

FIG. 3

| SIGNAL TIMING | 0 | 1 | 2 | 3 | 4 | 5 | 6 | 7 | 8 | 9 | ... |
|---|---|---|---|---|---|---|---|---|---|---|---|
| TRANSMISSION SIGNAL | 0 | 1 | 0 | 1 | 1 | 0 | 0 | 1 | 1 | 0 | ... |
| PHASE MODULATION SIGNAL | 1 | 0 | 0 | 1 | 1 | 1 | 1 | 0 | 0 | 0 | ... |
| OUTPUT LIGHT INTENSITY | 0 | 1 | 0 | 1 | 1 | 0 | 0 | 1 | 1 | 0 | ... |
| OUTPUT LIGHT PHASE | $\pi$ | 0 | 0 | $\pi$ | $\pi$ | $\pi$ | $\pi$ | 0 | 0 | 0 | ... |

FIG. 4

| INPUT | OUTPUT | |
|---|---|---|
| "0" → "1" | "0" | ↑ "1" |
| "1" → "1"<br>"1" → "0"<br>"0" → "0" | "1"<br>"1"<br>"0" | ↑ "0"<br>↑ "1"<br>↑ "0" |

FIG.5

| SIGNAL TIMING | 0 | 1 | 2 | 3 | 4 | 5 | 6 | 7 | 8 | 9 | ... |
|---|---|---|---|---|---|---|---|---|---|---|---|
| TRANSMISSION SIGNAL | 0 | 1 | 0 | 1 | 1 | 0 | 0 | 1 | 1 | 0 | ... |
| PHASE MODULATION SIGNAL | 1 | 1 | 0 | 0 | 0 | 1 | 1 | 1 | 1 | 0 | ... |
| OUTPUT LIGHT INTENSITY | 0 | 1 | 0 | 1 | 1 | 0 | 0 | 1 | 1 | 0 | ... |
| OUTPUT LIGHT PHASE | $\pi$ | $\pi$ | 0 | 0 | 0 | $\pi$ | $\pi$ | $\pi$ | $\pi$ | 0 | ... |

FIG. 6

| INPUT | OUTPUT | |
|---|---|---|
| "1" → "0" | "0" | ↑ "1" |
| "1" → "1" "0" → "1" "0" → "0" | "1" | ↑ "0" |
| | "1" | ↑ "1" |
| | "0" | ↑ "0" |

FIG. 9

| SIGNAL TIMING | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TRANSMISSION SIGNAL | 0 | 1 → | 0 | 1 → | 1 | 0 | 1 → | 0 | 1 → | 0 | 1 → | 0 | 1 → | 0 | 1 → | 0 |
| PHASE MODULATION SIGNAL | 1 | 0 | 0 | 1 | 1 | 1 | 0 | 0 | 1 | 1 | 0 | 0 | 1 | 1 | 0 | 0 |

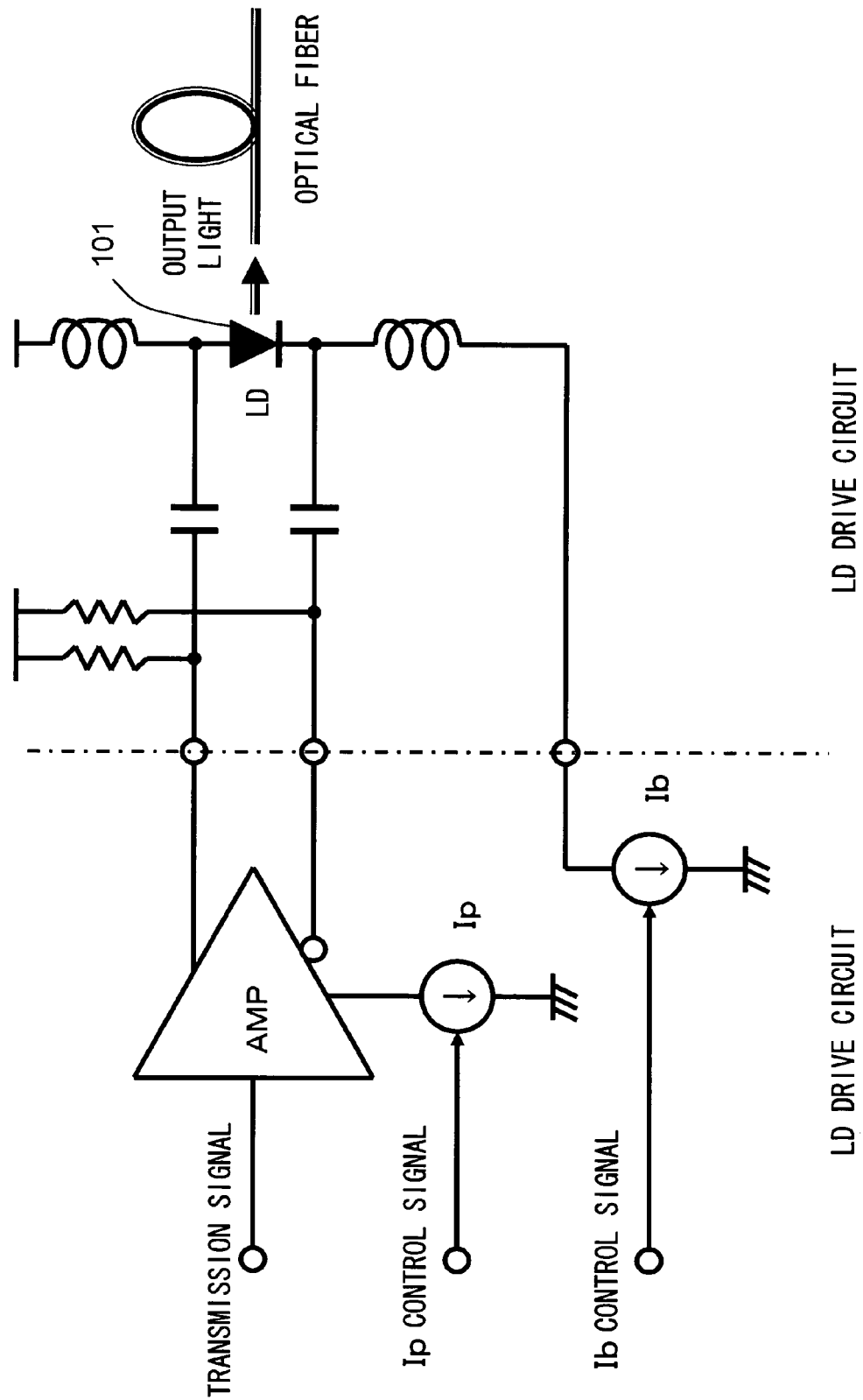

PRIOR ART

PRIOR ART

FIG. 15

| SIGNAL TIMING | 0 | 1 | 2 | 3 | 4 | 5 | 6 | 7 | 8 | 9 | ... |
|---|---|---|---|---|---|---|---|---|---|---|---|
| TRANSMISSION SIGNAL | 0 | 1 | 0 | 1 | 1 | 0 | 0 | 1 | 1 | 0 | ... |
| DUO BINARY SIGNAL 1 | 0 | -1 | 0 | 1 | 1 | 0 | 0 | 1 | 1 | 0 | ... |
| DUO BINARY SIGNAL 2 | 0 | 1 | 0 | -1 | -1 | 0 | 0 | -1 | -1 | 0 | ... |
| DUO BINARY SIGNAL INTENSITY | 0 | 1 | 0 | 1 | 1 | 0 | 0 | 1 | 1 | 0 | ... |
| PHASE | — | 0 | — | $\pi$ | $\pi$ | — | — | $\pi$ | $\pi$ | — | ... |

PRIOR ART

FIG. 16A

FOR TRANSMISSION SIGNAL "0" (INTENSITY MODULATION "OFF")

$$\cos(\omega t + \frac{\pi}{2}) + \cos(\omega t - \frac{\pi}{2}) = -\sin(\omega t) + \sin(\omega t) = 0$$

FIG. 16B

FOR TRANSMISSION SIGNAL "1" (INTENSITY MODULATION "ON")
(SIGNAL TIMING 1)

$$\cos(\omega t + \frac{\pi}{2} - \frac{\pi}{2}) + \cos(\omega t - \frac{\pi}{2} + \frac{\pi}{2}) = 2\cos(\omega t)$$

FIG. 16C

FOR TRANSMISSION SIGNAL "1" (INTENSITY MODULATION "ON")
(SIGNAL TIMING 3, 4, 7, 8)

$$\cos(\omega t + \frac{\pi}{2} + \frac{\pi}{2}) + \cos(\omega t - \frac{\pi}{2} - \frac{\pi}{2}) = 2\cos(\omega t + \pi)$$

PRIOR ART

PRIOR ART

FIG. 19

| | | 0 | 1 | 2 | 3 | 4 | 5 | 6 | 7 | 8 | 9 | ... |
|---|---|---|---|---|---|---|---|---|---|---|---|---|
| SIGNAL TIMING | | | | | | | | | | | | |
| TRANSMISSION SIGNAL | | 0 | 1 | 0 | 1 | 1 | 0 | 0 | 1 | 1 | 0 | ... |
| PHASE MODULATION SIGNAL | | 0 | 0 | 1 | 1 | 1 | 0 | 1 | 1 | 1 | 0 | ... |
| OUTPUT LIGHT | INTENSITY | 0 | 1 | 0 | 1 | 1 | 0 | 0 | 1 | 1 | 0 | ... |
| | PHASE | 0 | 0 | π | π | π | 0 | π | π | π | 0 | ... |
| | | | | ⇦ | | ⇦ | | ⇦ | | | | |

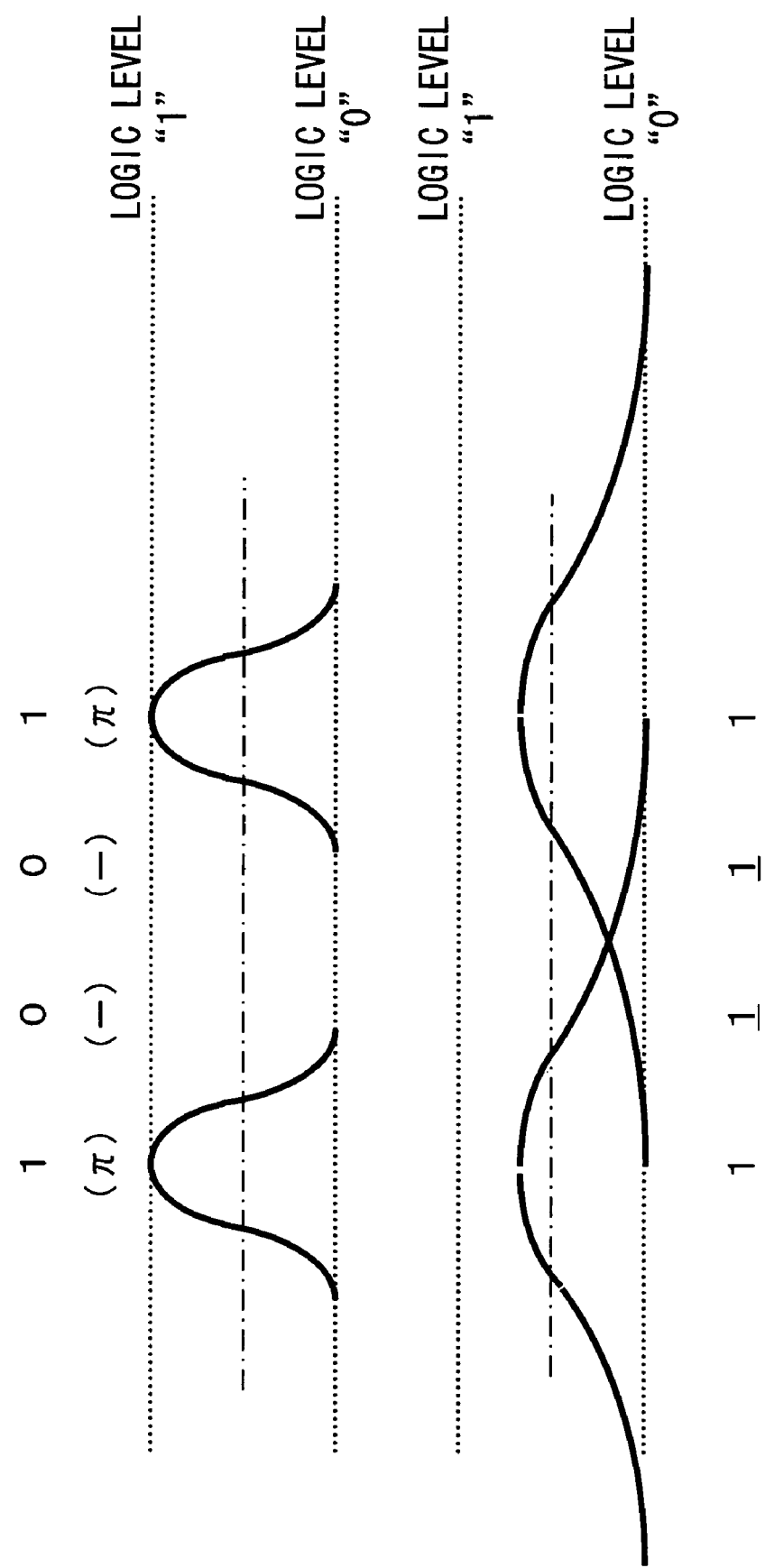

OPTICAL TRANSMISSION DEVICE AND OPTICAL PHASE MODULATOR

BACKGROUND OF THE INVENTION

1. Field of the Invention

The present invention relates to an optical transmission device and an optical phase modulator for enabling increased transmission rate and transmission distance.

2. Description of the Related Art

Recently, large capacity transmission networks using light have been widely used. In an optical transmission system which constitutes such an optical network, an IM/DD (intensity modulation/direct detection) scheme is extensively implemented. In such an IM/DD scheme, intensity of an optical output is modulated, using logic levels of a signal to be transmitted such as "0" and "1" which correspond to states of the optical output such as a "luminescent state" and a "non-luminescent state", respectively. Then, the received modulated optical signal is photoelectrically converted and directly detected using a photodiode (PD) or the like. As an optical transmission line for use in the optical network, a single-mode optical fiber is commonly employed. However, the wavelength dispersion characteristics of single-mode optical fibers result in an increased pulse width, degradation of the received optical signal, and interference between symbols, thereby imposing limitations on transmission rate and distance.

Techniques related to optical transmission will be described in detail with reference to the attached drawings. FIG. 11 illustrates a direct intensity modulation technique, in which the intensity of an optical output of an LD (laser diode) is directly modulated using an LD drive circuit.

Referring now to FIG. 11, an LD drive current is composed of a bias current (Ib) controlled by an Ib control signal and a modulation current (Ip) controlled by an Ip control signal. The LD drive current is applied to an LD 101. The LD, 101 then produces output light (optical signal) whose intensity is modulated in accordance with a transmission signal.

FIGS. 12A through 12C illustrate output light whose intensity is modulated in accordance with a transmission signal.

FIG. 12A illustrates the transmission signal. FIG. 12B illustrates the intensity-modulated output light. The LD 101 is biased by the Ib and outputs a continuance wave (CW) optical signal which is modulated by the Ip in accordance with the transmission signal. A logic level "0" and a logic level "1" of the transmission signal represent a non-luminescent state and a luminescent state of the output light, respectively. The output light of FIG. 12B can generally be represented by a waveform as shown in FIG. 12C in which the CW is not shown.

In the following, a state of an optical signal transmitting a transmission signal which is at logic level "0" is referred to as a non-luminescent state or "Off", and a state of an optical signal transmitting the transmission signal which is at logic level "1" is referred to as a luminescent state or "On".

FIG. 13 illustrates degradation of an optical signal. For example, when a transmission signal over three time slots has a logic level sequence of "101", an optical receiver, when used in short distance transmission, can distinguish the logic level transitions, as shown in FIG. 13A. However, when the optical signal is received by the optical receiver after long distance transmission, the amplitude of the optical signal becomes smaller at logic level "1", and the pulse width of the optical signal becomes longer at logic level "1", as shown in FIG. 13B. This causes the optical receiver to misrecognize the signal element of the logic level "0" in the second time slot as the signal element of the logic level "1", due to the expanded pulse width of each adjacent signal element of the logic level "1". The likelihood that this misrecognition occurs increases as a signal interval of one time slot becomes shorter, which results from an increased transmission rate, and as a receiving level for an optical signal becomes shorter, which results from an increased transmission distance.

With a view to overcoming the foregoing, or to realizing a higher transmission rate as well as a longer transmission distance, an optical duo binary technique is proposed by Yonenaga et al. [3], "Optical duo binary transmission system with no receive sensitivity degradation", Electronics Letters, Vol. 31 No. 4, 16 Feb. 1995, and in Japanese Unexamined Patent Application Publication No. 08-139681. In the proposed duo binary technique, a binary signal having logic levels "0" and "1" is transmitted, so that the signal is recognized to have three logic levels; a logic level "0" and two different logic levels "1", for each of which the phase of the signal is shifted by $\pi$ radians.

FIG. 14 is a first diagram illustrating the duo binary technique. FIG. 15 is a second diagram illustrating the duo binary technique. FIG. 16 is a third diagram illustrating the duo binary technique.

In FIG. 14, an LD 101 is configured to be controlled by an LD drive circuit 102 in which a bias current (Ib) is set and to output a CW as a source of an optical carrier. A duo binary encoding circuit 104 generates a duo binary signal 1 and a duo binary signal 2 for producing duo binary codes. The intensity and phase of the CW are modulated by a Mach-Zehnder interferometer-type optical intensity modulator (MZ) 103, in accordance with the duo binary signal 1 and the duo binary signal 2 supplied through the respective drivers 105.

In FIG. 15, for example, in signal timing 0 through signal timing 9, each signal timing corresponding to a time slot, a logic level sequence of a transmission signal is "0101100110". The logic level sequence of the intensity of an optical duo binary signal that represents output light is "0101100110." The phase of the optical duo binary signal is indefinite and represented as "–", when the signal intensity logic level is "0". When the signal intensity is at logic level "1" in signal timing 1, the phase of the optical duo binary signal is "0". In signal timings 3, 4, 7, and 8, the signal intensity in each signal timing is at logic level "1", and the phase of the optical duo binary signal is "1". This indicates the phase of duo binary signal is configured to be inverted with respect to the phase in signal timing 1, in this case, with signal intensity logic level "1". In this example, a signal for applying an electric field to a first waveguide of the MZ 103 of FIG. 3 refers to the duo binary signal 1, and a signal for applying an electric field to a second waveguide of the MZ 103 of FIG. 3 refers to the duo binary signal 2. The phase inversion (phase shift by $\pi$ radians) with respect to the phase of a signal element of logic level "1" is represented as "–1".

The equation of FIG. 16A illustrates a case where the transmission signal is at logic level "0" (intensity modulation "Off"). A first CW (optical carrier signal) traveling along the first waveguide of the MZ 103 can be represented as $COS(\omega t+\pi/2)$, and a second CW traveling along the second waveguide of the MZ 103 can be represented as $COS(\omega t-\pi/2)$. This indicates that the first CW and the second CW from the first and second waveguides of the MZ 103 are combined, which results in output light whose amplitude is "0". The equation of FIG. 16B illustrates a case where the transmission signal is at logic level "1" (intensity modulation "On") with respect to signal timing 1. The first CW traveling along the first waveguide of the MZ 103 is phase modulated so as to be represented as $\cos(\omega t+\pi/2-\pi/2)$, and the second CW traveling along the second waveguide of the MZ 103 is phase modulated so as to be represented as $\cos(\omega t+\pi/2+\pi/2)$. Then, the first CW and the second CW are combined, so as to be represented as $2\cos(\omega t)$.

FIG. 16C illustrates a case where the transmission signal is at logic level "1" (intensity modulation "On") with respect to signal timings 3, 4, 7, and 8. The first CW traveling along the first waveguide of the MZ 103 is phase modulated so as to be represented as $\cos(\omega t+\pi/2+\pi/2)$, and the second CW traveling along the second waveguide of MZ 103 is phase modulated so as to be represented as $\cos(\omega t-\pi/2-\pi/2)$. Then, the first CW and the second CW are combined, thereby being represented as $2\cos(\omega t+\pi)$.

Thus, an optical transmission device for transmitting a ternary optical signal can be realized in such a manner as described above. The ternary optical signal includes three values each of which can be represented by a phase value "0" resulted from a transmission signal at logic level "0", and two different phase values "$2\cos(\omega t)$" and "$2\cos(\omega t+\pi)$" of the CW optical signal, which are obtained where the transmission signal is at logic level "1".

FIG. 17 illustrates a characteristic of the duo binary technique, with respect to the optical signal generated through the duo binary technique described with reference to FIG. 14 and FIG. 15. For example, where a logic level sequence of a transmission signal over three time slots is "101" similarly to the case of FIG. 13, long distance transmission results in the smaller amplitude and the longer pulse width, as illustrated in FIG. 17B. On the other hand, as shown in FIG. 17A, the phases of the signal elements of logic level "1" in the first and third time slots are inverted with respect to each other. This can compensate the interference caused by the adjacent signal elements of logic level "1," which may occur in the timing when the transmission signal is at the logic level "0", in the second time slot, in this case. Thus, the receiver can distinguish the signal element at the logic level "0" without error.

However, the above duo binary technique needs a signal generation procedure for converting a binary signal into a ternary signal and for obtaining a ternary electric signal for driving an optical modulator, resulting in further needs for complicated modulating means and means for driving the modulating means.

Japanese Unexamined Patent Application Publication No. 10-112688 discloses a duo binary technique in view of the above disadvantage. In the duo binary technique, an optical intensity modulator provided in a preceding stage performs intensity modulation on a optical signal, and an optical phase modulator provided in a subsequent stage performs phase inversion on the intensity modulated optical signal which is at logic level "0".

FIG. 18 illustrates an optical transmission device which implements the duo binary technique. The optical transmission device includes an LD drive circuit 110, an LD 111, an optical intensity modulator 112, an optical phase modulator 113, plural drivers 115, an encoding circuit 121, and a delay circuit 122. The LD drive circuit 110 applies an LD current, in which a bias current (Ib) is set, to the LD 111. The LD 111 oscillates in response to the bias current set to be larger than or equal to a stimulated emission threshold LD current and then generates a continuous wave (CW) optical signal. The optical intensity modulator 112 modulates the intensity of the CW optical signal generated by the LD 111 in accordance with a transmission signal received through the driver 115. More specifically, the intensity of the CW optical signal is modulated so as to be in a non-luminescent state when the transmission signal is at logic level "0", and to be in a luminescent state when the transmission signal is at logic level "1". The optical phase modulator 113 modulates the phase of the intensity-modulated CW optical signal in accordance with a phase modulation signal. The encoding circuit 121 generates a control signal (phase modulation signal) for causing the optical phase modulator 113 to invert the phase of the CW optical signal (phase shift by $\pi$ radians), in response to the logic level "0" of the transmission signal. The delay circuit 122 delays the phase modulation signal, thereby matching the timing of the phase modulation signal with the timing of phase modulator 113.

FIG. 19 illustrates an example of code conversion according to the duo binary technique. In signal timing 0 to signal timing 9, a logic level sequence of a transmission signal over ten time slots is "0101100110". Under this condition, the logic level sequence of the intensity of output light is "0101100110", in which "0" and "1" indicate a non-luminescent state and a luminescent state, respectively. The phase of the output light represents code conversion in which the phase of a CW optical carrier signal is inverted (shifted by $\pi$ radians) with respect to a preceding phase, when the transmission signal is at logic level "0". For example, in signal timing 0, the logic level of the output light intensity is "0", and the phase is inverted to "0". In signal timing 1, the logic level of the output light intensity is "1", and thus the phase is held to be "0". In signal timing 2, the logic level of the output light intensity is "0", and thus the phase is inverted (shifted by $\pi$ radians). In signal timing 3 and signal timing 4, the logic level of the output light intensity is "1", and thus the phase is held to be "$\pi$". In signal timing 5, the logic level of the output light intensity is "0", and thus the phase is inverted to "0". Likewise, in signal timing 6 and signal timing 9, the phase is inverted, and in signal timing 7 and signal timing 8, the phase in the previous signal timing is maintained. The encoding circuit 121 generates a phase modulation signal whose logic level is shifted when the transmission signal is at logic level "0", thereby controlling the optical phase modulator 113.

FIG. 20 illustrates signal degradation that occurs in the duo binary technique of FIG. 19. In FIG. 19, in signal timing 1 and signal timing 3, the phases of the optical signal elements at logic level "1" of the output light are inverted with respect to each other. On the other hand, in signal timing 4 and signal timing 7, the phases of the optical signal elements at logic level "1" of the output light are identical, or $\pi$ radians. Thus, as illustrated in FIG. 17C, the phases of the CW optical signal elements in signal timing 1 and signal timing 3 are inverted with respect to each other. This cancels the interference that occurs in signal timing 2 in this example, or when the signal is at logic level "0", due to the adjacent signal elements at logic level "1", which enables an optical receiver to distinguish each logic level without error. However, in signal timing 4 and signal timing 7, the phases of the CW optical signal elements in each timing are identical, or $\pi$ radians, leaving the cancellation of the interference insufficient.

As described above, the optical transmission device employs the duo binary technique, in which an optical intensity modulator arranged at a preceding stage modulates the intensity of an optical signal and in which an optical phase modulator arranged at a subsequent stage inverts the phase of the intensity modulated optical signal in response to an optical signal intensity logic level "0" (in a non-luminescent state). In such an optical transmission device, when a logic level sequence of a transmission signal over four time slots is "1001", an optical signal element which corresponds to a transmission signal component of logic level "0" (non-luminescent state) may be misrecognized as being at logic level "1" (luminescent state) due to an extended pulse width. This phenomenon has imposed a limitation on increases in transmission rate and distance. More specifically, as a transmission rate increases, a time slot interval becomes shorter. As a transmission distance increases, a receiving level for an optical signal becomes lower, making transmission vulnerable to interference between symbols.

SUMMARY OF THE INVENTION

The present invention has been made in consideration of the above circumstance. Accordingly, the present invention provides an optical transmission device and an optical phase modulator for realizing a higher transmission rate and a longer transmission distance.

According to an aspect of the present invention, an optical transmission device includes an optical phase modulator for modulating a phase of an intensity-modulated optical signal and a signal conversion circuit. The signal conversion circuit provides a control signal to the optical phase modulator, so that when a state of the intensity-modulated optical signal shifts from a first luminescent state, through a non-luminescent state, to a second luminescent state, the phase of the optical signal in the first luminescent state and the phase of the optical signal in the second luminescent state are inverted with respect to each other, or so that when the state of the intensity-modulated optical signal shifts from the first luminescent state, through at least two non-luminescent states, to a third luminescent state, the phase of the optical signal in the first luminescent state and the phase of the optical signal in the third luminescent state are inverted with respect to each other.

According to an embodiment of the present invention, the optical transmission device is provided, in which when there is at least one optical signal element representing a non-luminescent state between optical signal elements each representing a luminescent state, the phases of the optical signal elements each representing the luminescent state are inverted with respect to each other.

According to another aspect of the present invention, an optical phase modulator modulates a phase of an intensity-modulated optical signal, so that when the state of the intensity-modulated optical signal shifts from a first luminescent state, through a non-luminescent state, to a second luminescent state, the phase of the optical signal in the first luminescent state and the phase of the optical signal in the second luminescent state are inverted with respect to each other, or so that when the state of the intensity-modulated optical signal shifts from the first luminescent state, through two or more non-luminescent states, to a third luminescent state, the phase of the optical signal in the first luminescent state and the phase of the optical signal in the third luminescent state are inverted with respect to each other.

According to an embodiment of the present invention, the optical phase modulator is provided, in which when there is at least one optical signal element representing a non-luminescent state between optical signal elements each representing a luminescent state, the phases of the optical signal elements each representing the luminescent state are inverted with respect to each other.

The optical transmission device and optical phase modulator according to an embodiment of present invention are capable of generating output light in which even when there are two or more optical signal elements each representing a non-luminescent state between optical signal elements each representing a luminescent state, the phases of the optical signal elements each representing the luminescent state are inverted with respect to each other.

Accordingly, the optical transmission device and the optical phase modulator according to an embodiment of the present invention can realize further increases in transmission rate and transmission distance, compared with the above-mentioned IM/DD technique and the technique disclosed in Japanese Unexamined Patent Application Publication No. 10-112688, as will be hereinafter described with reference to FIG. 10.

Moreover, the optical phase modulator according to the present invention requires only half the amount of the modulation bandwidth used by the known techniques. This facilitates implementation of features of known phase modulators.

BRIEF DESCRIPTION OF THE DRAWINGS

FIG. 3 is a first diagram illustrating a condition in an optical phase modulator;

FIG. 4 is a first diagram illustrating a logic operation of a signal conversion circuit;

FIG. 5 is a second diagram illustrating a condition in an optical phase modulator;

FIG. 6 is a second diagram illustrating a logic operation of a signal conversion circuit;

FIG. 9 illustrates cycles of a phase modulation signal;

FIG. 11 illustrates a direct intensity modulation;

FIG. 15 is a second diagram illustrating a duo binary technique;

FIGS. 16A through 16C are equations illustrating a duo binary technique;

FIG. 19 illustrates an example of code conversion by a duo binary technique; and FIG. 20 illustrates signal degradation in the duobinary technique of FIG. 19.

DESCRIPTION OF THE PREFERRED EMBODIMENTS

The present invention will be described in detail with reference to the accompanying drawings, in which like numbers refer to the same or similar elements.

First Embodiment

Figure 1:
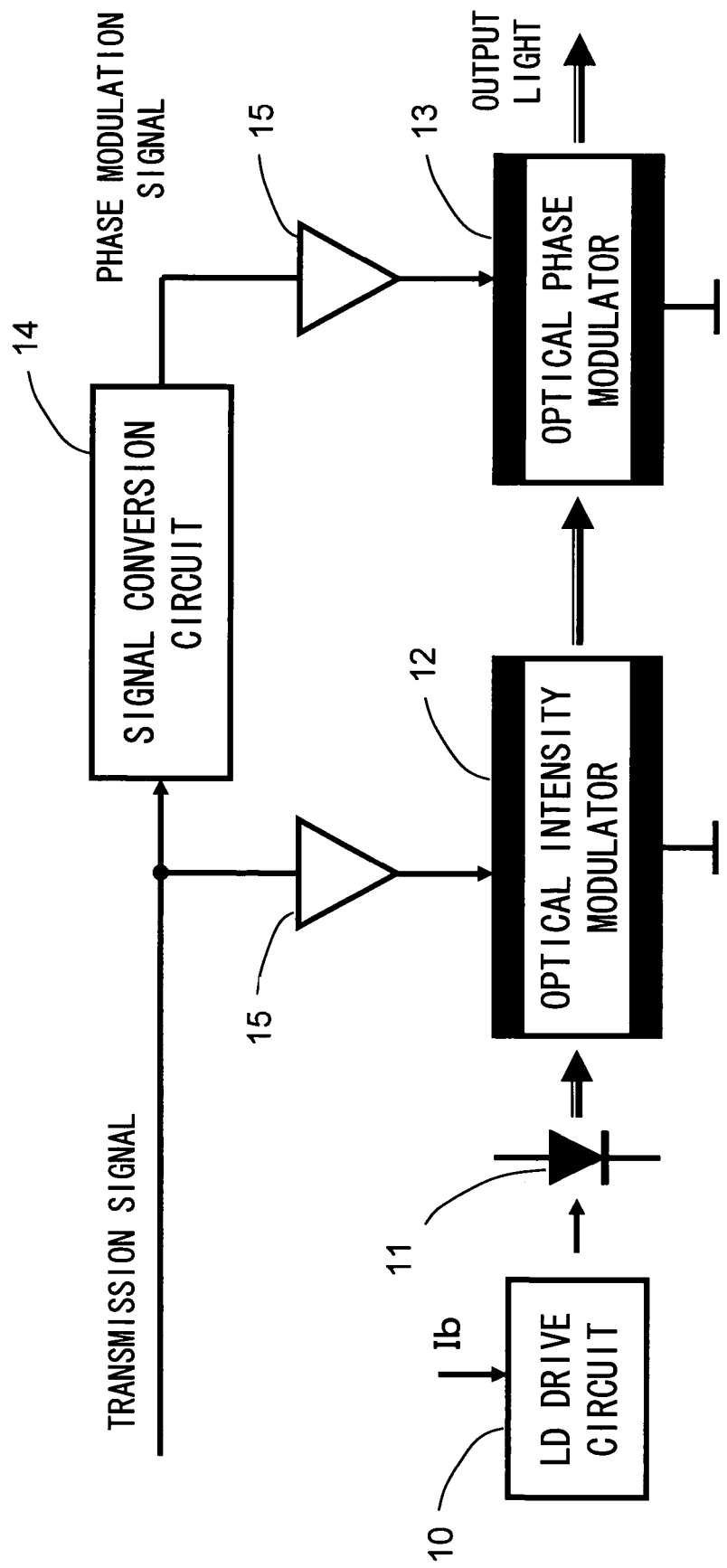
FIG. 1 is a first diagram illustrating an optical transmission device according to an embodiment of the present invention.

FIG. 1 is a first diagram illustrating an optical transmission device according to an embodiment of the present invention. The optical transmission device is provided with the following components: a laser diode (LD) drive circuit 10, an LD 11, an optical intensity modulator 12, an optical phase modulator 13, a signal conversion circuit 14, and plural drivers 15. The LD 11 and the optical intensity modulator 12 are coupled through an optical path. The optical intensity modulator 12 and the optical phase modulator 13 are also coupled through an optical path. The LD drive circuit 10 applies an LD current in which a bias current (Ib) is provided. The LD 11 oscillates in response to the bias current set to be larger than or equal to a stimulated emission threshold LD current and then generates a continuous wave (CW) as a source of an optical carrier signal. The optical intensity modulator 12 modulates the intensity of the CW optical signal which is generated from the LD 11 in accordance with a transmission signal received through the driver 15. More specifically, the intensity modulation is performed, so that the CW optical signal is in a non-luminescent state when the transmission signal is at logic level "0", and the CW optical signal is in a luminescent state when the transmission signal is at logic level "1". The optical phase modulator 13 modulates the phase of the intensity-modulated CW optical signal, in accordance with a phase modulation signal received through the driver 15. The signal conversion circuit 14 generates a control signal (phase modulation signal) for controlling the optical phase modulator 13, such that when the state of an intensity-modulated optical signal shifts from a first luminescent state, through a non-luminescent state, to a second luminescent state, the phase of the optical signal in the first luminescent state and the phase of the optical signal in the second luminescent state are inverted with respect to each other. More specifically, when the logic level of the transmission signal received by the signal conversion circuit 14 shifts from "0" to "1", the logic level of the phase modulation signal is inverted. The signal conversion circuit 14 matches the timing of the phase modulation signal with the timing of the intensity-modulated optical signal on the basis of the characteristics of the optical intensity modulator 12. The optical intensity modulator 12 may be a Mach-Zehnder optical intensity modulator produced using lithium niobate (LiNbO3:LN) which is an optical modulation element utilizing a non-linear optical effect, a Mach-Zehnder optical intensity modulator produced using a semiconductor, or an electro-absorption (EA) type optical intensity modulator. The optical phase modulator 13 may be a Mach-Zehnder optical phase modulator produced using lithium niobate (LiNbO3:LN) which is an optical modulation element utilizing a non-linear optical effect or a Mach-Zehnder optical phase modulator produced using a semiconductor.

Second Embodiment

Figure 2:
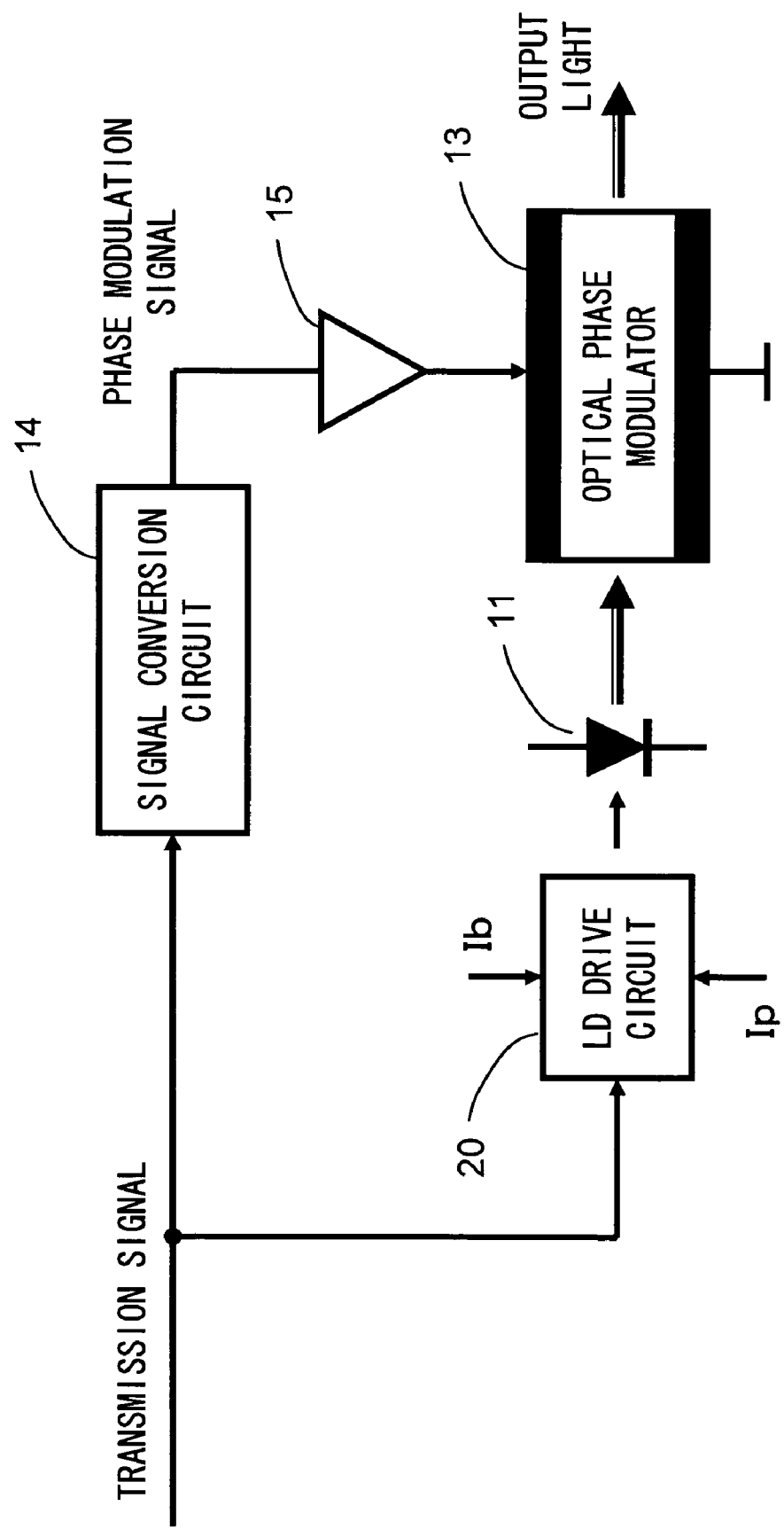
FIG. 2 is a second diagram illustrating an optical transmission device according to an embodiment of the present invention.

FIG. 2 is a second diagram illustrating an optical transmission device according to an embodiment of the present invention. The optical transmission device has an LD drive circuit 20 and an LD 11 which is coupled with an optical phase modulator 13 through an optical path. The LD drive circuit 20 applies to the LD 11 an LD drive current in which a bias current (Ib) and a modulation current (Ip) based on a transmission signal are provided. The LD 11 oscillates in response to the bias current (Ib) set to be larger than or equal to a stimulated emission threshold LD current. The LD 11 then generates a continuous wave (CW) as the source of an optical carrier signal which is directly modulated, so that the optical signal is in a non-luminescent state when the transmission signal is at logic level "0", and the optical signal is in a luminescent state when the transmission signal is at logic level "1". The optical phase modulator 13 modulates the phase of the intensity-modulated CW optical signal in accordance with a phase modulation signal received through the driver 15. The signal conversion circuit 14 generates a control signal (phase modulation signal) for controlling the optical phase modulator 13, such that when the state of an intensity-modulated optical signal shifts from a first luminescent state, through a non-luminescent state, to a second luminescent state, the phase of the optical signal in the first luminescent state and the phase of the optical signal in the second luminescent state are inverted with respect to each other. More specifically, when the logic level of the transmission signal received by the signal conversion circuit 14 shifts from "0" to "1", the logic level of the phase modulation signal is inverted. The optical intensity modulator 12 may be a Mach-Zehnder optical intensity modulator produced using lithium niobate (LiNbO3:LN) which is an optical modulation element utilizing a non-linear optical effect, a Mach-Zehnder optical intensity modulator produced using a semiconductor, or an electro-absorption (EA) type optical intensity modulator. The optical phase modulator 13 may be a Mach-Zehnder optical phase modulator produced using lithium niobate (LiNbO3:LN) which is an optical modulation element utilizing a non-linear optical effect or a Mach-Zehnder optical phase modulator produced using a semiconductor.

According to the first and second embodiments, the optical transmission device is capable of generating an optical signal, in which when there is at least one optical signal element representing a non-luminescent state between optical signal elements each representing luminescent state, the phases of the optical signal elements each representing the luminescent state are inverted with respect to each other. Moreover, the optical transmission device is capable of generating an optical signal, in which when there is at least one optical signal element representing a luminescent state between optical signal elements each representing a non-luminescent state, the phases of the optical signal elements each representing the non-luminescent state are inverted with respect to each other.

Consequently, even when there are two or more optical signal elements of non-luminescent states over two time slots between optical signal elements of the luminescent state, interference caused by the adjacent optical signal elements of the luminescent states can be canceled. Therefore, this reduces interference between symbols that may occur when the optical signal is transmitted through a single mode optical fiber that is widely used as an optical transmission line for an optical network.

Third Embodiment

FIG. 3 is a first diagram illustrating a condition in the optical phase modulator of FIG. 1 or FIG. 2. For example, in signal timing 0 to signal timing 9, a logic level sequence of a transmission signal over ten time slots is "0101100110". In this condition, every time at least one optical signal element representing a non-luminescent state is located between optical signal elements each representing a luminescent state, the phases of the optical signal elements each representing the luminescent state are inverted with respect to each other.

In signal timing 0, output light is in the non-luminescent state, and a phase modulation signal is at logic level "1". Thus, the phase of the output light is "π" in this timing. In signal timing 1, the output light is in the luminescent state. In this case, since the output light in the preceding timing is in the non-luminescent state, the phase is inverted to "0". In signal timing 2, since the output light is in the non-luminescent state, the phase in the preceding timing is held to be "0." In signal timing 3, the output light is in the luminescent state. Since the output light in the preceding timing is in the non-luminescent state, i.e., there is an optical signal element representing the non-luminescent state between optical signal elements representing the luminescent state, the phase is inverted to "π". In signal timing 4, the output light is in the luminescent state. However, the output light in the preceding timing is in the luminescent state as well, i.e., there is no optical signal element of the non-luminescent state between optical signal elements of the luminescent state. Thus, the phase of the output light in the preceding timing is held to be "π". In each signal timing 5 and signal timing 6, the output light is in the non-luminescent state, and the phase of the output light in the preceding timing is held to be "π". In signal timing 7, the output light is in the luminescent state, and the output light in the preceding timing is in the non-luminescent state, i.e., there are optical signal elements of the non-luminescent state between optical signal elements of the luminescent state. Thus, the phase is inverted to "0" in this timing. In signal timing 8, the output light is in the luminescent state, and the output light in the preceding timing is also in the luminescent state, i.e., there are no optical signal elements of the non-luminescent state between optical signal elements of the luminescent state. Thus, the phase in the preceding timing is held to be "0". In signal timing 9, similarly to signal timing 2, the phase is held to be "0". The signal conversion circuit 14 generates a phase control signal as a control signal, so that the optical phase modulator 13 can produce the phase sequence of the output light as described above. Specifically, when the phase of the output light is to be "0", the phase control signal is at logic level "0", and when the phase of the output light is to be "π", the phase control signal is at logic level "1".

Figure 4:
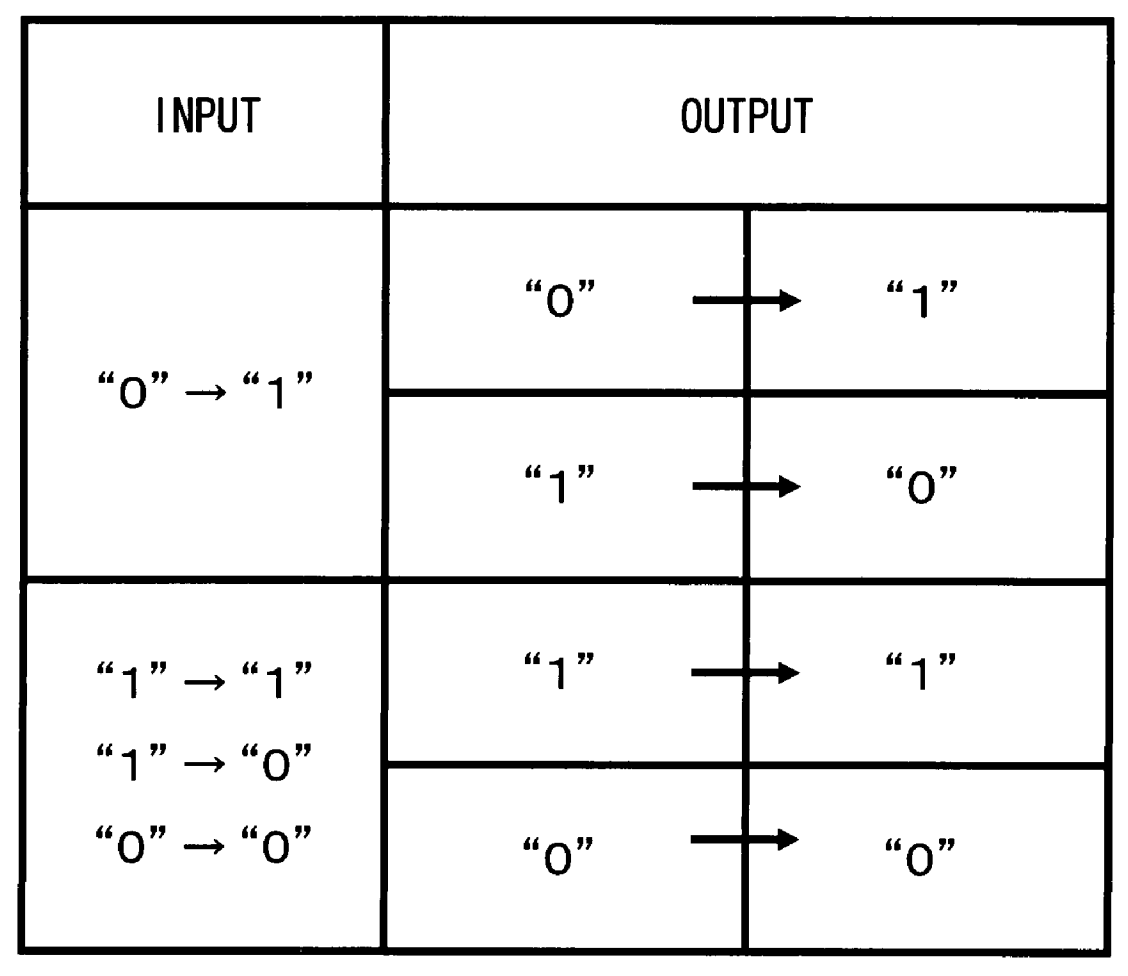

FIG. 4 is a first diagram illustrating a logic operation of the signal conversion circuit of FIG. 1 or FIG. 2, which allows creation of such a state sequence in the optical phase modulator as described above with reference to FIG. 3. In a condition where the logic level of an input signal of the signal conversion circuit 14 shifts from "0" to "1", if the present logic level of an output signal of the signal conversion circuit 14 is "0", the logic level shifts to "1". In the same condition, if the present logic level of the output signal is "1", the logic level shifts to "0". In a condition where the logic level of the input signal of the signal conversion circuit 14 shifts from "1" to "0" or where no shift occurs to the logic level, the present logic level of the output signal is maintained. In the latter condition, if the present logic level of the output signal is "1" or "0", the logic level "1" or "0" is output from the signal conversion circuit 14, respectively.

Fourth Embodiment

FIG. 5 is a second diagram illustrating a condition in the optical phase modulator of FIG. 1 or FIG. 2. For example, in signal timing 0 to signal timing 9, a logic level sequence of a transmission signal over ten time slots is "0101100110". In FIG. 5, a state sequence of output light to be generated is illustrated, in which every time at least one optical signal element of a CW optical carrier signal representing a luminescent state is located between optical signal elements each representing a non-luminescent state, the phases of the optical signal elements each representing the non-luminescent state are inverted with respect to each other.

In signal timing 0, the output light is in the non-luminescent state, and a phase modulation signal is at logic level "1". Thus, the phase of the output light is "π". In signal timing 1, the output light is in the luminescent state, and thus the phase of the output light in the preceding timing is held to be "π". In signal timing 2, since the output light is in the non-luminescent state, whereas the output light in the preceding state is in the luminescent state. This indicates that there is an optical signal element of the luminescent state between optical signal elements of the non-luminescent state, and thus the phase is inverted to "0". In each signal timing 3 and signal timing 4, the output light is in the luminescent state, and thus the phase of the output light in the preceding timing is maintained. In signal timing 5, the output light is in the non-luminescent state. Since the output light in the preceding timing is in the luminescent state, the phase is inverted to "π". In signal timing 6, the output light is in the non-luminescent state. Since the output light in the preceding timing is in the non-luminescent state, i.e., there is no optical signal element of the luminescent state between optical signal elements of the non-luminescent state, the phase of the output light in the preceding timing is held to be "π". In each signal timing 7 and signal timing 8, the output light is in the luminescent state, the phase of the output light in the preceding timing is held to be "π". In signal timing 9, similarly to signal timing 2, the phase is inverted to "0". The signal conversion circuit 14 generates an phase control signal as a control signal for causing the optical phase modulator 13 to generate the phase state of output light as described above, in which the phase "0" of the output light corresponds to the signal logic level "0", and the phase "π" of the output light corresponds to the signal logic level "1".

Figure 6:
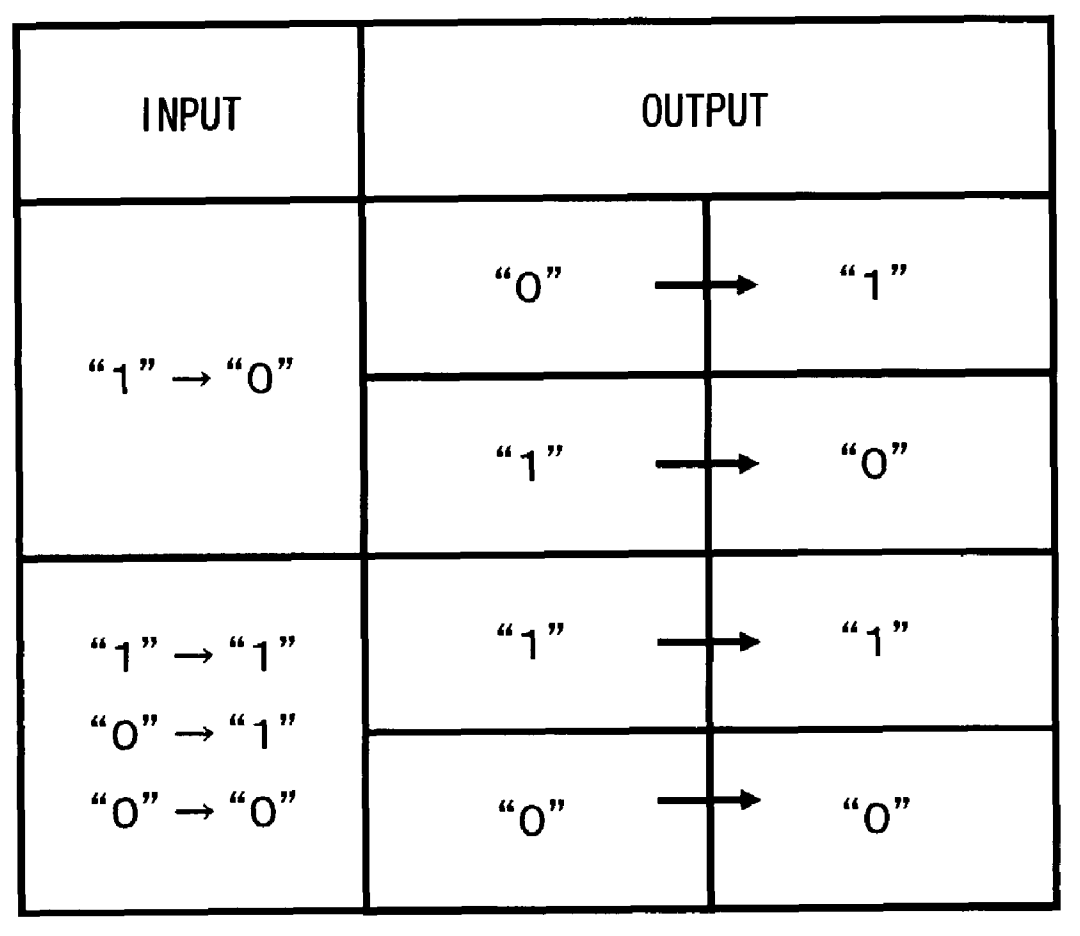

FIG. 6 is a second diagram illustrating a logic operation of the signal conversion circuit of FIG. 1 or FIG. 2, which allows creation of the state sequence in the optical phase modulator as described above with reference to FIG. 5. In a condition where the logic level of an input signal of the signal conversion circuit 14 shifts from "1" to "0", if the present logic level of an output signal of the signal conversion circuit 14 is "0", the logic level shifts to "1". In the same condition, if the present logic level of the output signal is "1", the logic level shifts to "0". In a condition where the logic level of the input signal of the signal conversion circuit 14 shifts from "0" to "1" or where no shift occurs to the logic level, the present logic level of the output signal is maintained. In the latter condition, when the present logic level of the output signal is "1" or "0", the logic level "1" or "0" is output from the signal conversion circuit 14, respectively.

Fifth Embodiment

Figure 7:
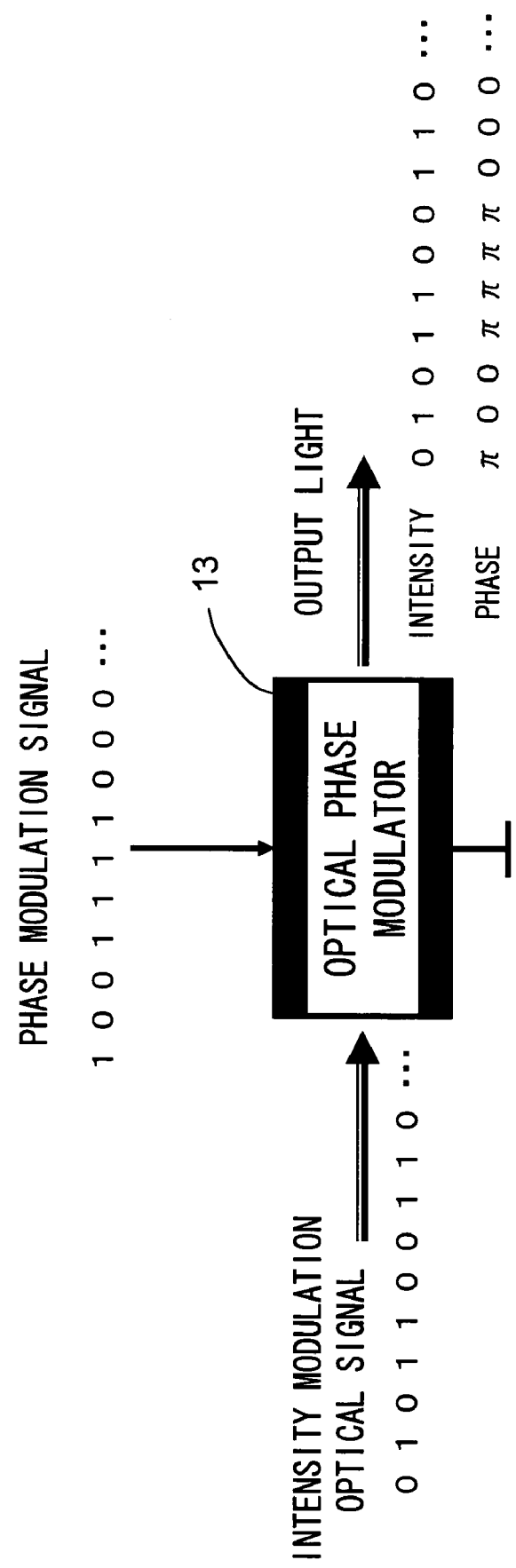
FIG. 7 illustrates an optical phase modulator according to an embodiment of the present invention.

FIG. 7 illustrates the optical phase modulator of FIG. 1 or FIG. 2, which is associated with the state sequence described with reference to FIG. 3, for example. The optical phase modulator 13 receives an intensity-modulated optical signal (intensity modulation optical signal) through an optical path. The logic level sequence of the intensity modulation optical signal over ten time slots is "0101100110". The optical phase modulator 13 also receives a phase modulation signal, a control signal for performing phase modulation, which has a logic level sequence of "1001111000". The phase modulation signal is received at an appropriate timing for modulating the intensity modulation optical signal. The optical phase modulator 13 causes the phase of the intensity modulation optical signal to be inverted (phase shifted by $\pi$ radians), when the phase modulation signal is at logic level "1", or causes the phase of the intensity modulation optical light to be maintained, when the phase modulation signal is at logic level "0". Therefore, the optical phase modulator 13 produces output light having an intensity logic level sequence of "0101100110" and a phase sequence of "$\pi 00\pi\pi\pi\pi 000$". The optical phase modulator as illustrated with reference to FIG. 5 also performs a similar operation. The optical phase modulator 13 may be a Mach-Zehnder optical phase modulator produced using lithium niobate (LiNbO3:LN) which is an optical modulation element utilizing a non-linear optical effect or a Mach-Zehnder optical phase modulator produced using a semiconductor.

Sixth Embodiment

Figure 8A:
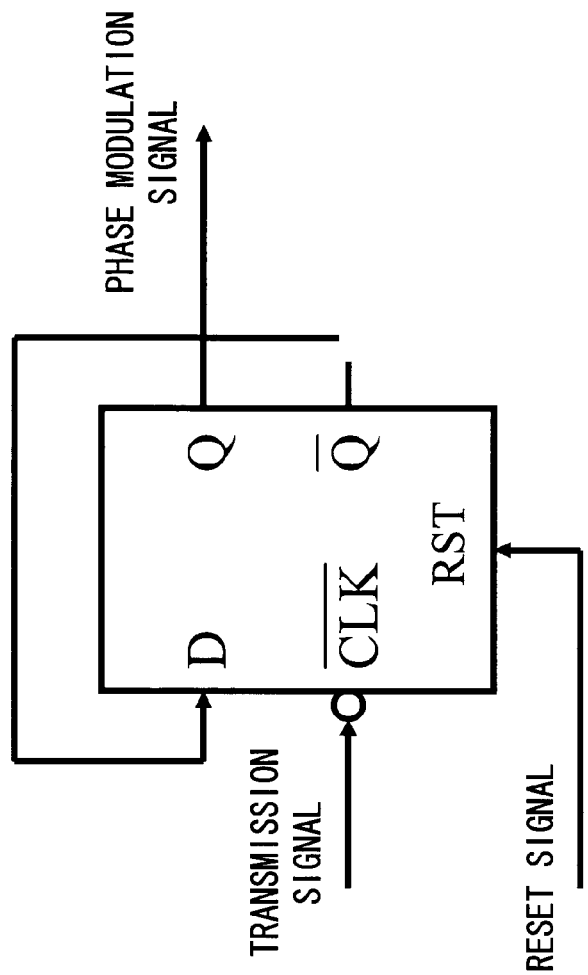
FIG. 8A illustrates a signal conversion circuit according to an embodiment of the present invention.
Figure 8B:
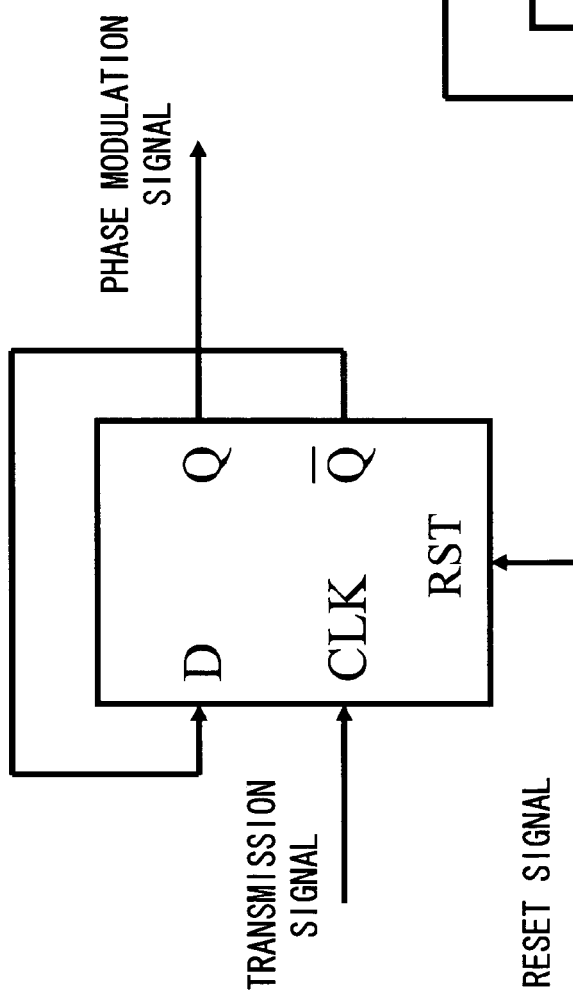
FIG. 8B illustrates a signal conversion circuit according to an embodiment of the present invention.

FIGS. 8A and 8B illustrate the signal conversion circuit of FIG. 1 or FIG. 2. FIG. 8A shows a configuration of the signal conversion circuit 14 which is associated with the logic described with reference to FIG. 4. FIG. 8B shows a configuration of the signal conversion circuit 14 associated with the logic operations described with reference to FIG. 6. As illustrated by a D flip-flop (D-FF) in FIG. 8A, the logic operations illustrated in FIG. 4 can be implemented by a circuit configuration of the D-FF in which an inverted output is supplied to a data input terminal D, and a transmission signal, which is the input of the signal conversion circuit 14, is input to a clock terminal (CLK). This configuration causes the logic level of the output to be inverted when the logic level of the transmission signal shifts from "0" to "1". A reset terminal (RST) is provided for setting the output logic when the signal conversion circuit 14 is activated. Likewise, the logic operations described with reference to FIG. 6 can be implemented by a D-FF shown in FIG. 8B, which causes the logic level of the output to be inverted when the logic level of the transmission signal shifts from "1" to "0".

FIG. 9 illustrates cycles of a phase modulation signal. For each of signal timing 0 to signal timing 15, the logic level sequence of a transmission signal over in 16 time slots is "0101101010101010". When the signal conversion circuit 14 has the configuration as illustrated in FIG. 8A, the logic level of a phase modulation signal is inverted if the logic level of the transmission signal shifts from "0" to "1".

Thus, the number of cycles (frequency) used in the phase modulation signal to be supplied to the optical phase modulator 13 is demultiplied by a factor of two with respect to a maximum frequency of the transmission signal. This indicates that modulation performed by the optical phase modulator 13 requires half the amount of bandwidth compared to the bandwidth of a corresponding transmission signal. Therefore, this facilitates implementation of the features of known phase modulators.

As described above, the optical transmission device and the optical transmission system are provided, in which: when there is at least one optical signal element representing a non-luminescent state between optical signal elements each representing a luminescent state, the phases of the optical signal elements each representing the luminescent state are inverted with respect to each other; or in which when there is at least one optical signal element representing the luminescent state between optical signal elements each representing the non-luminescent state, the phases of the optical signal elements each representing the non-luminescent state are inverted with respect to each other. In the optical transmission device and the optical transmission system, interference between symbols, which occurs in the optical signal element of the non-luminescent state between the signal elements of the luminescent state, can be canceled, which contributes to increases in transmission rate and distance.

In addition, in the optical transmission device and the optical transmission system, phase modulation is performed so that the phase of the optical signal is inverted when the state of an intensity modulated optical signal shifts from a luminescent state to a non-luminescent state, or when the state of the intensity modulated optical signal shifts from a non-luminescent state to a luminescent state. Therefore, the number of cycles (frequency) used in a control signal which is used to control an optical phase modulator is demultiplied by a factor of two with respect to the number of cycles (frequency) of the luminescent state and non-luminescent state in the optical signal. This indicates that modulation performed by the optical phase modulator requires half the amount of bandwidth compared with the bandwidth of a corresponding transmission signal. Therefore, this facilitates implementation of the features of known phase modulators.

Figure 10:
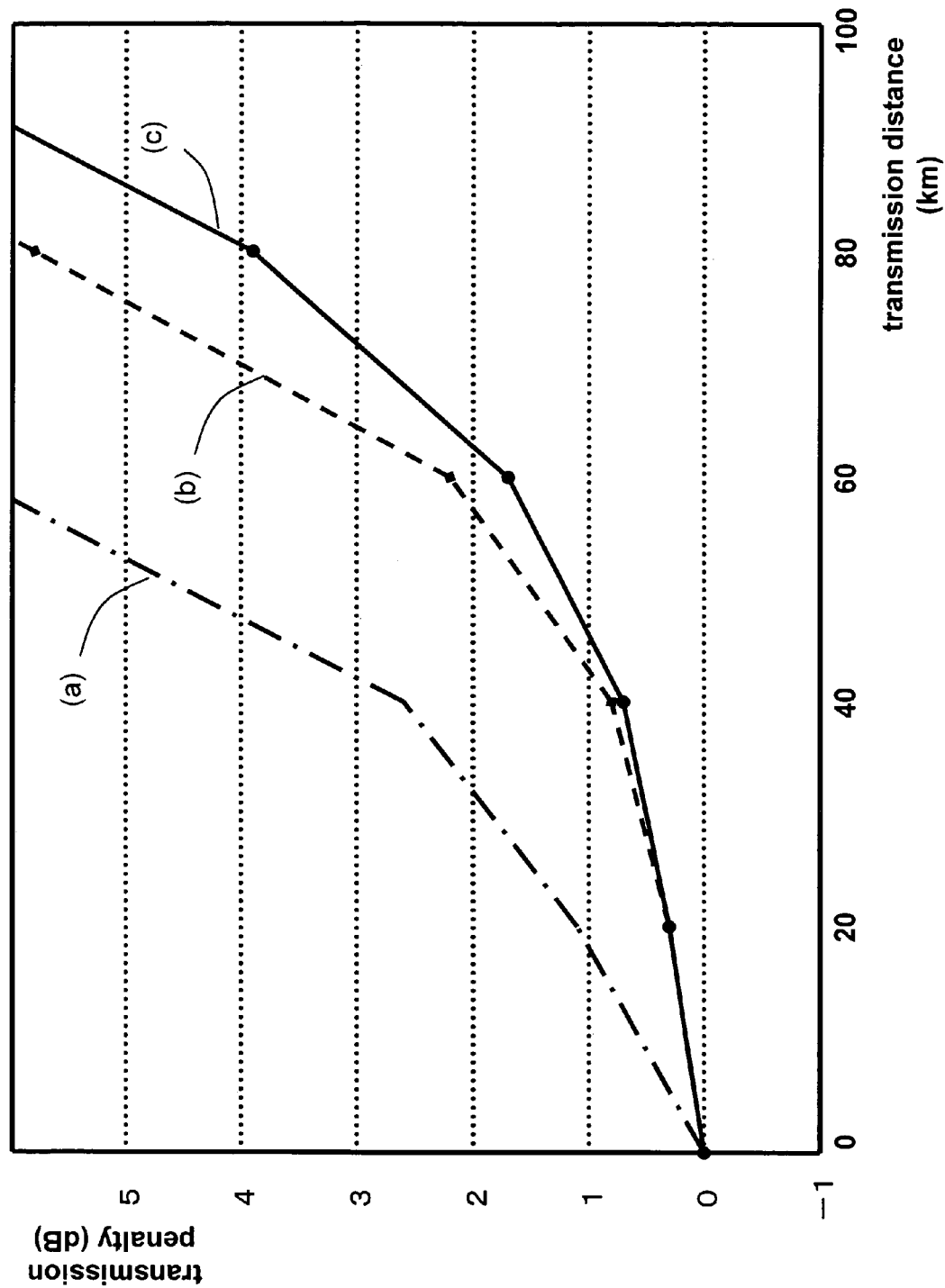
FIG. 10 illustrates an effect of the present invention.
Figure 12A:
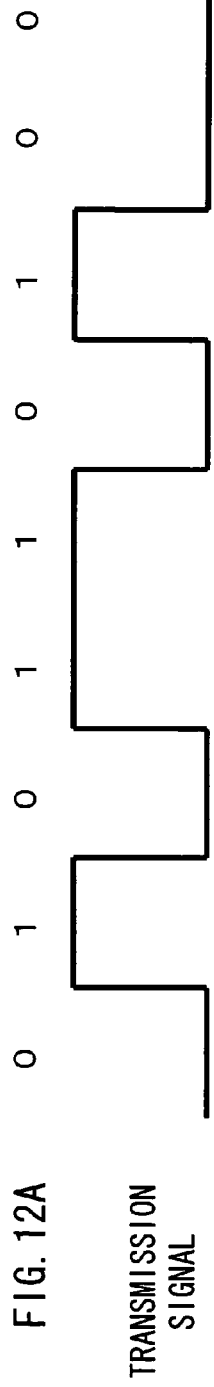
FIGS. 12A through 12C illustrate an intensity-modulated optical signal in accordance with a transmission signal.
Figure 12B:
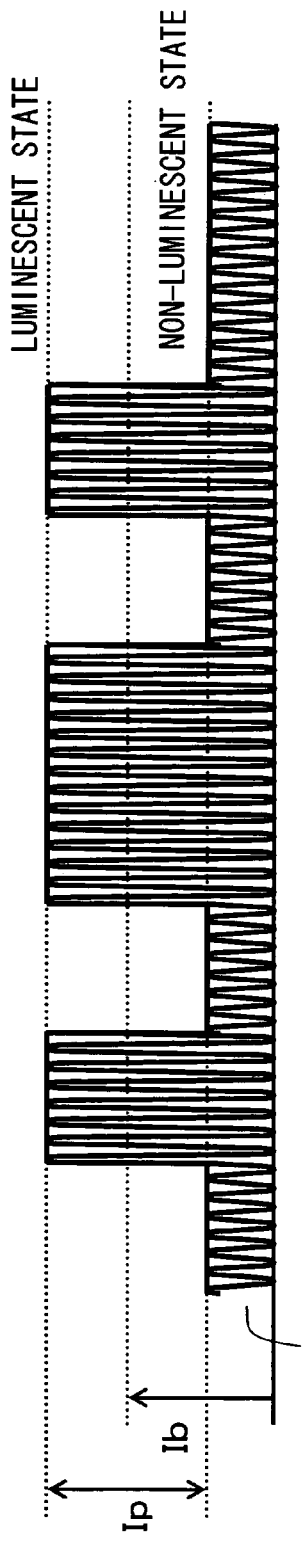
Figure 12C:
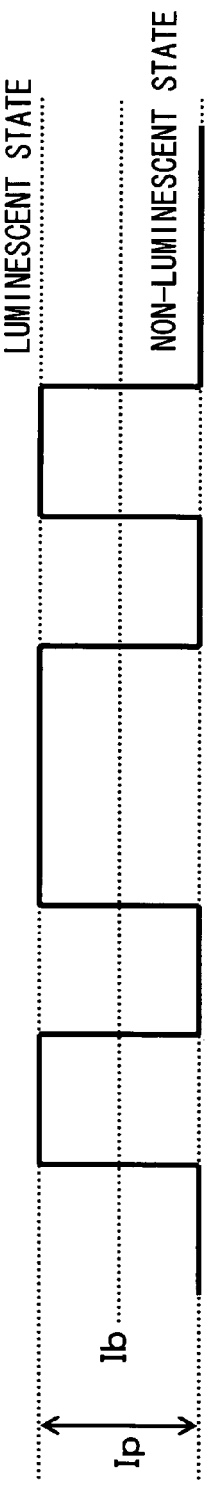
Figure 13A:
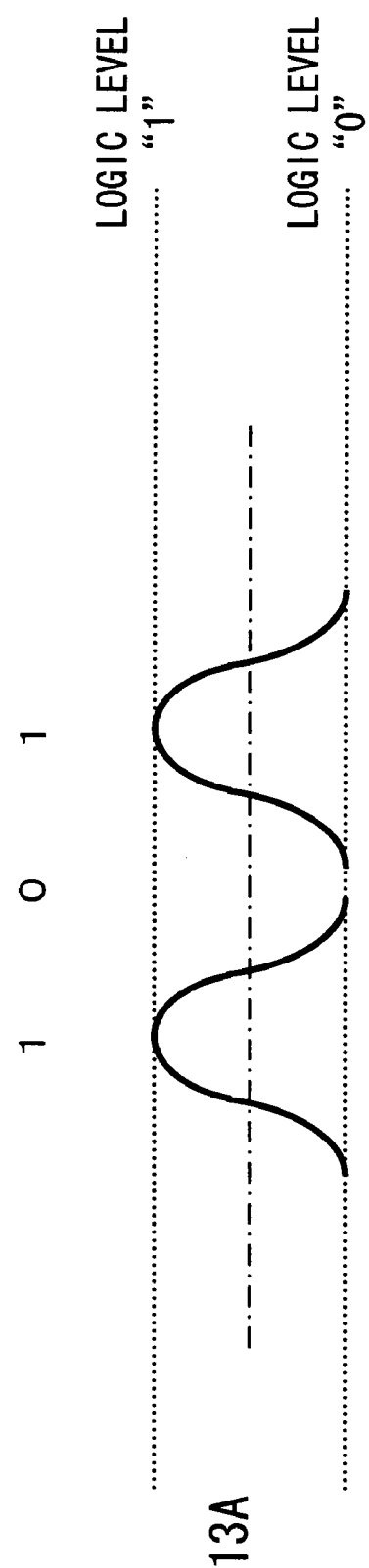
FIGS. 13A and 13B illustrate degradation of output light.
Figure 13B:
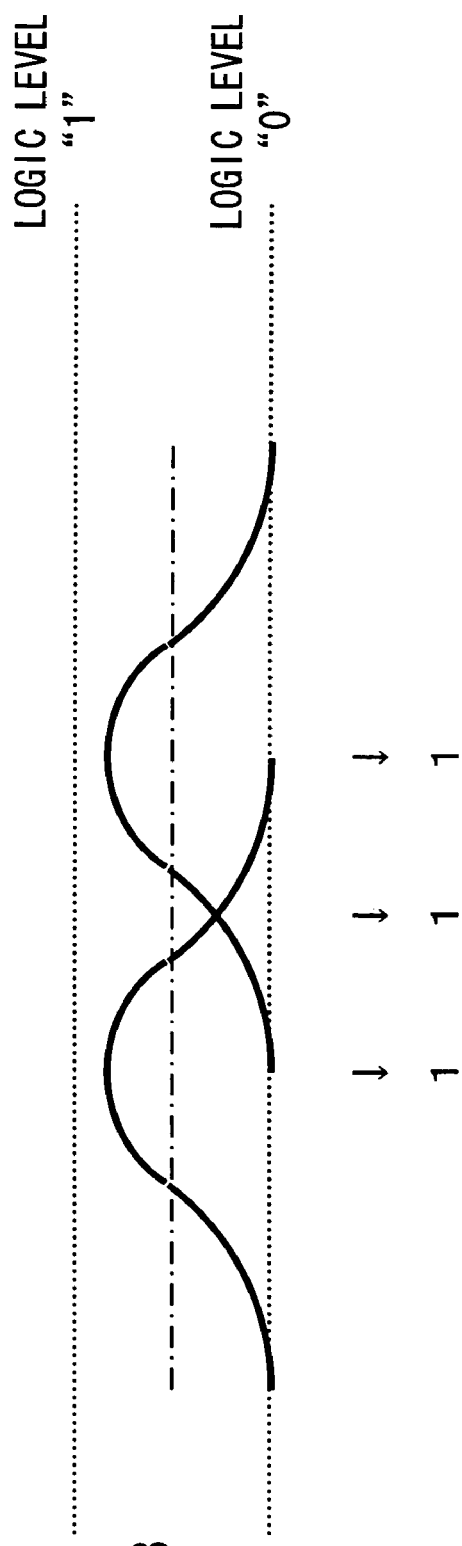
Figure 14:
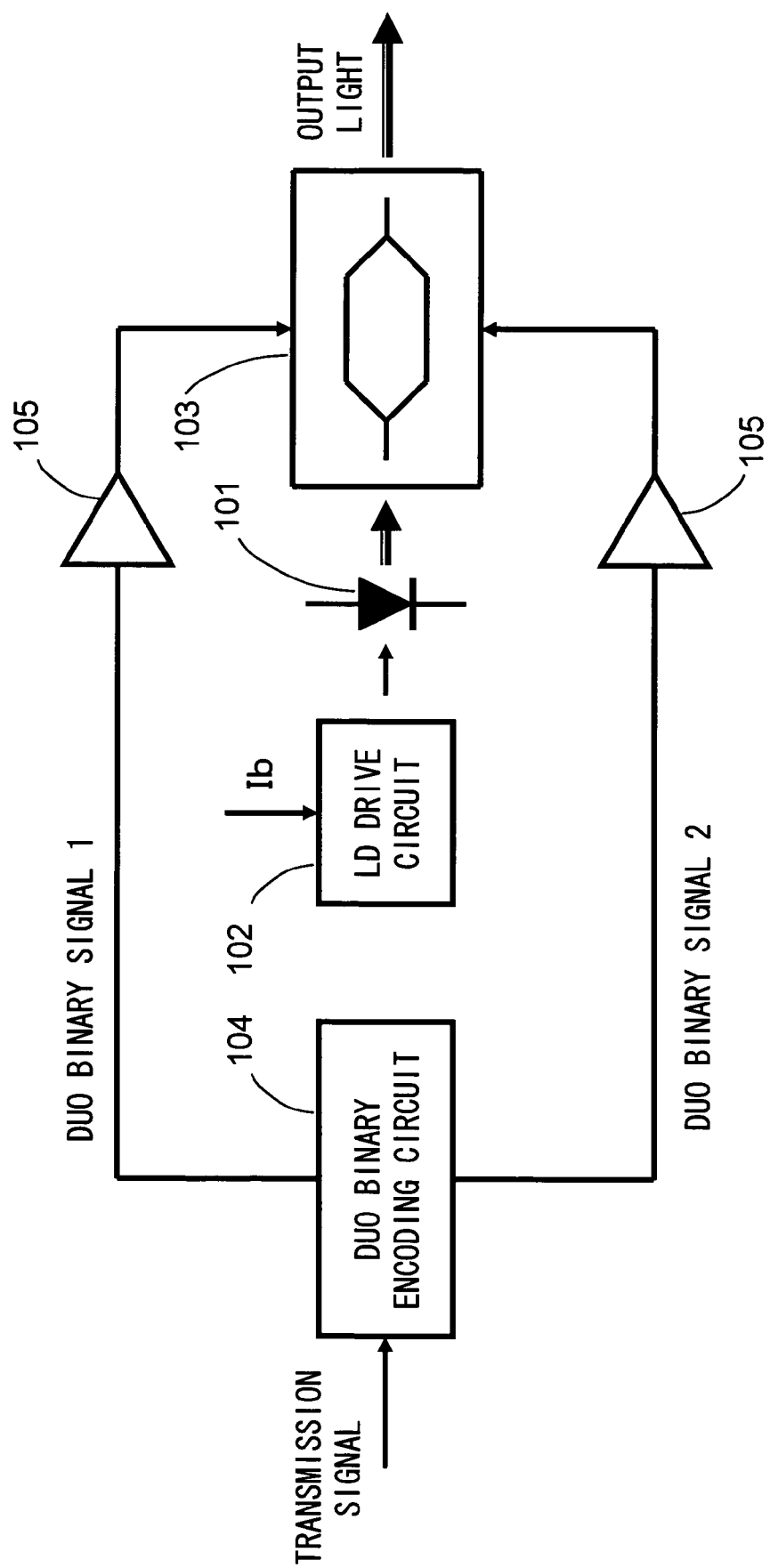
FIG. 14 is a first diagram illustrating a duo binary technique.
Figure 17A:
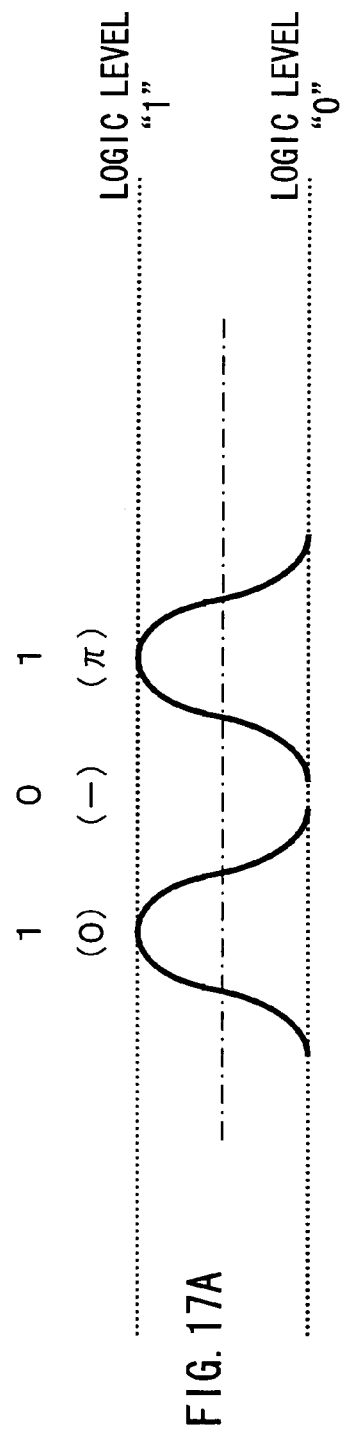
FIGS. 17A through 17C illustrate a characteristic of a duo binary technique.
Figure 17B:
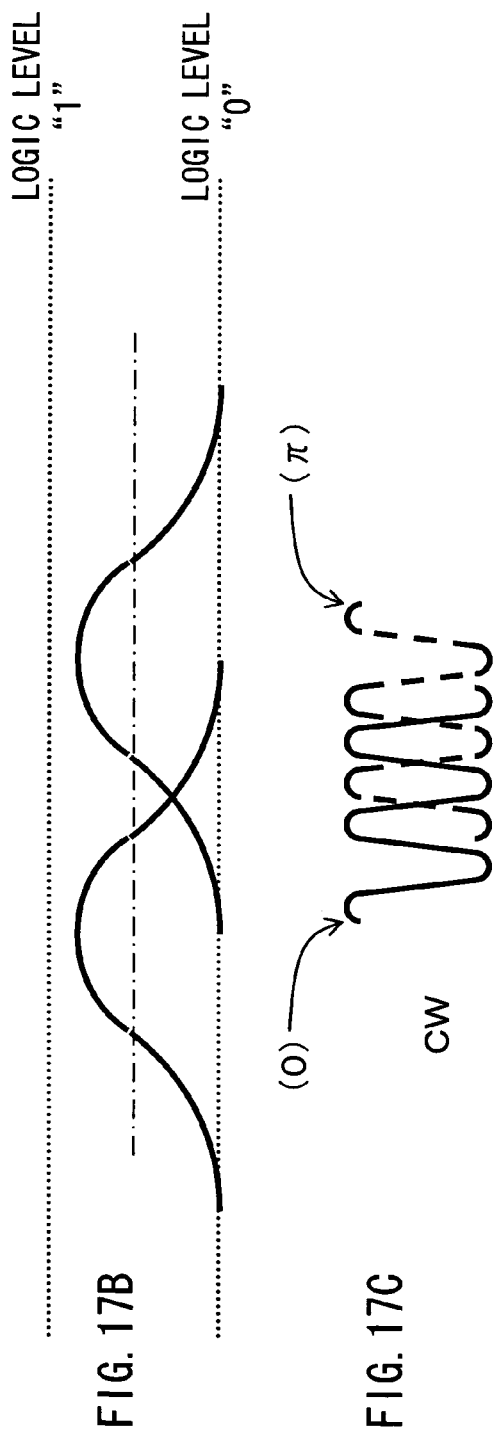
Figure 17C:
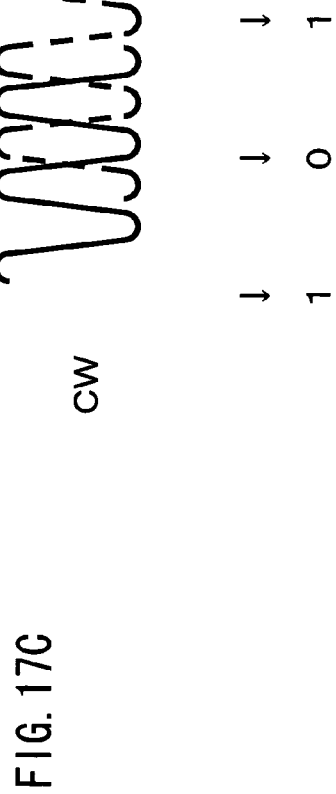
Figure 18:
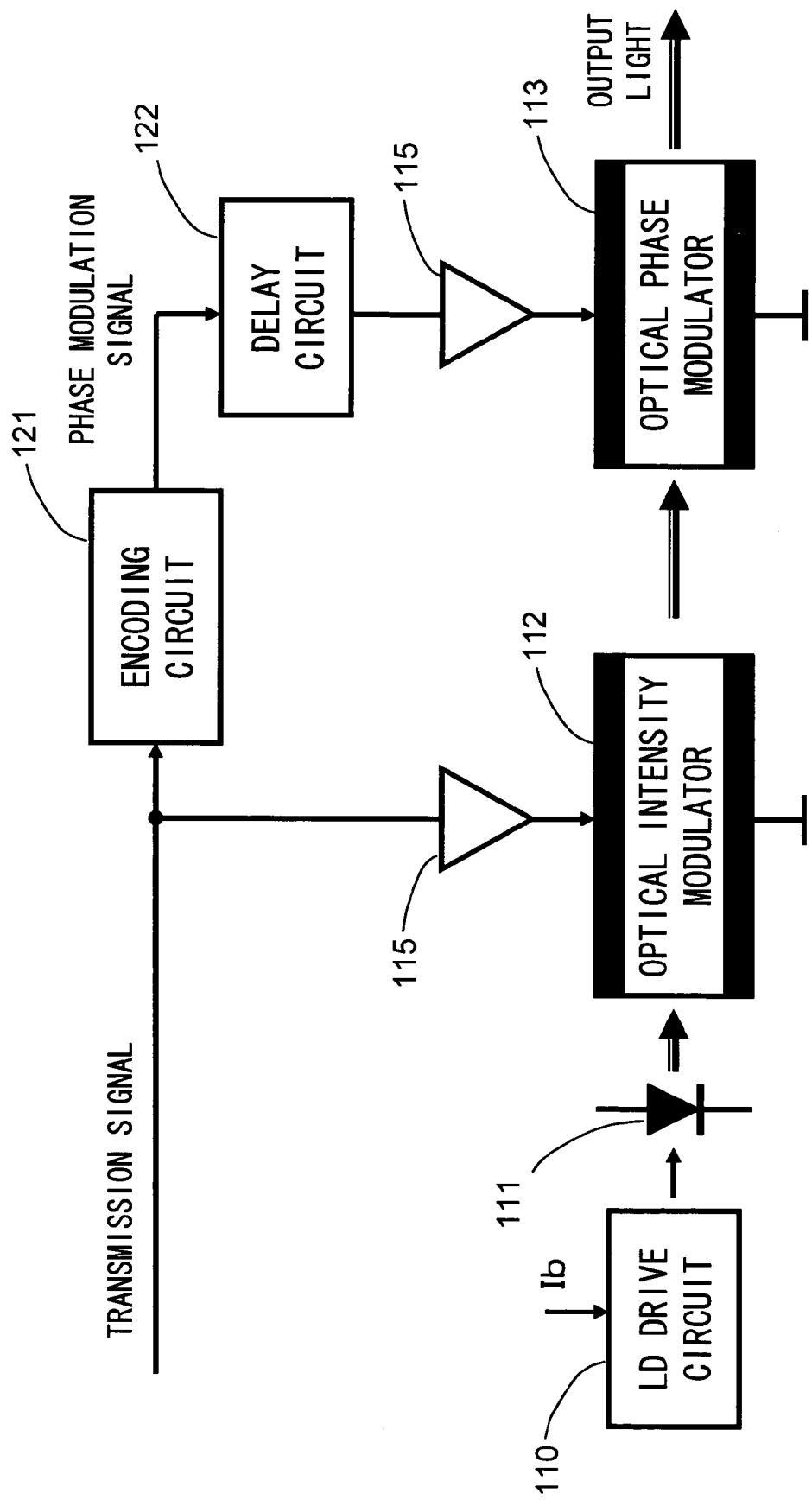
FIG. 18 illustrates an optical transmission device implementing a duo binary technique.

FIG. 10 is a graph illustrating an effect of the present invention. A line (a) in the graph represents a simulated relationship between a transmission distance and a transmission penalty in an optical transmission system that uses the known IM/DD technique. A line (b) represents a simulated relationship between a transmission distance and a transmission penalty in an optical transmission system that uses the technique disclosed in the Japanese Unexamined Patent Application Publication No. 10-112688. A line (c) represents a simulated relationship between a transmission distance and a transmission penalty in an optical transmission system that employs an embodiment of the present invention.

In FIG. 10, when the allowable transmission penalty in each of the optical transmission systems is 3 db, the transmission distance of the optical transmission system using the known IM/DD technique is approximately 40 km, 65 km in an optical transmission system that uses the technique disclosed in the Japanese Unexamined Patent Application Publication No. 10-112688, and 70 km in the optical transmission system that employs an embodiment of the present invention.

What is claimed is:

1. An optical transmission device comprising:
   an optical phase modulator for modulating a phase of an optical signal modulated by an intensity of a transmission signal; and
   a signal conversion circuit for providing a control signal to the optical phase modulator, so that when a state of the optical signal shifts from a first luminescent state, through one non-luminescent state, to a second luminescent state, the phase of the optical signal in the first luminescent state and the phase of the optical signal in the second luminescent state are inverted with respect to each other, or so that when a state of the optical signal shifts from the first luminescent state, through two or more non-luminescent states, to a third luminescent state, the phase of the optical signal in the first luminescent state and the phase of the optical signal in the third luminescent state are inverted with respect to each other.

2. The optical transmission device according to claim 1, wherein the optical signal is generated using an optical intensity modulator for modulating an output light of an optical source, and is transmitted through an optical path for coupling the optical intensity modulator to the optical phase modulator.

3. The optical transmission device according to claim 1, wherein the optical signal is generated using an optical source for permitting direct modulation, and is transmitted through an optical path for coupling the optical source to the optical phase modulator.

4. The optical transmission device according to claim 1, wherein the signal conversion circuit provides the control signal to the optical phase modulator so as to invert the phase of the optical signal when the state of the optical signal shifts from a non-luminescent state to a luminescent state.

5. The optical transmission device according to claim 1, wherein the signal conversion circuit provides the control signal to the optical phase modulator so as to invert the phase of the optical signal when the state of the optical signal shifts from a luminescent state to a non-luminescent state.

6. The optical transmission device according to claim 1, wherein the optical phase modulator comprises one of a Mach-Zehnder optical phase modulator produced using lithium niobate (LiNbO3:LN) and a Mach-Zehnder optical phase modulator produced using a semiconductor.

7. The optical transmission device according to claim 2, wherein the optical intensity modulator comprises one of a Mach-Zehnder optical intensity modulator produced using lithium niobate (LiNbO3:LN), a Mach-Zehnder optical intensity modulator produced using a semiconductor, and an electro-absorption (EA) type optical intensity modulator.

8. An optical phase modulator for modulating a phase of an optical signal modulated by an intensity of a transmission signal, so that when a state of the optical signal shifts from a first luminescent state, through one non-luminescent state, to a second luminescent state, the phase of the optical signal in the first luminescent state and the phase of the optical signal in the second luminescent state are inverted with respect to each other, or so that when a state of the optical signal shifts from the first luminescent state, through two or more non-luminescent states, to a third luminescent state, the phase of the optical signal in the first luminescent state and the phase of the optical signal in the third luminescent state are inverted with respect to each other.

9. The optical phase modulator according to claim 8, wherein the optical signal is generated using an optical intensity modulator for modulating an output light of an optical source, and is transmitted through an optical path for coupling the optical intensity modulator to the optical phase modulator.

10. The optical phase modulator according to claim 8, wherein the optical signal is generated using an optical source for permitting direct modulation, and is transmitted through an optical path for coupling the optical source to the optical phase modulator.

11. The optical phase modulator according to claim 8, wherein the optical phase modulator modulates the optical signal so as to invert the phase of the optical signal when the state of the optical signal shifts from a non-luminescent state to a luminescent state.

12. The optical phase modulator according to claim 8, wherein the optical phase modulator modulates the optical signal so as to invert the phase of the optical signal when the state of the optical signal shifts from a luminescent state to a non-luminescent state.

13. The optical phase modulator according to claim 8, further comprising:
one of a Mach-Zehnder optical phase modulator produced using lithium niobate (LiNbO3:LN) and a Mach-Zehnder optical phase modulator produced using a semiconductor.

14. The optical phase modulator according to Claim 9, wherein the optical intensity modulator comprises one of a Mach-Zehnder optical intensity modulator produced using lithium niobate (LiNbO3:LN), a Mach-Zehnder optical intensity modulator produced using a semiconductor, and an electro-absorption (EA) type optical intensity modulator.

* * * * *